(12) United States Patent
Domanovac et al.

(10) Patent No.: US 11,829,343 B2
(45) Date of Patent: Nov. 28, 2023

(54) GENERATING A BUSINESS OBJECT

(71) Applicant: Syntio Ltd., Zagreb (HR)

(72) Inventors: Tomislav Domanovac, Zagreb (HR); Ivan Zeko, Velika Gorica (HR)

(73) Assignee: Syntio Ltd., Zagreb (HR)

( * ) Notice: Subject to any disclaimer, the term of this patent is extended or adjusted under 35 U.S.C. 154(b) by 0 days.

(21) Appl. No.: 17/807,748

(22) Filed: Jun. 20, 2022

(65) Prior Publication Data
US 2023/0004547 A1 Jan. 5, 2023

Related U.S. Application Data

(60) Provisional application No. 63/202,937, filed on Jun. 30, 2021.

(51) Int. Cl.
*G06F 7/00* (2006.01)
*G06F 16/23* (2019.01)
*G06F 16/28* (2019.01)
*G06F 16/2455* (2019.01)

(52) U.S. Cl.
CPC .... *G06F 16/2358* (2019.01); *G06F 16/24564* (2019.01); *G06F 16/289* (2019.01)

(58) Field of Classification Search
CPC .......... G06F 9/44563; G06F 16/2358; G06F 16/2448; G06F 16/245; G06F 16/24564; G06F 16/289; G06F 63/08; G06F 63/083
USPC ........................................................ 707/703
See application file for complete search history.

(56) References Cited

U.S. PATENT DOCUMENTS

| | | | |
|---|---|---|---|
| 6,529,948 B1 * | 3/2003 | Bowman-Amuah | G06F 9/4493 709/219 |
| 2005/0015619 A1 | 1/2005 | Lee | |
| 2007/0299975 A1 | 12/2007 | Daschakowsky et al. | |
| 2013/0110765 A1 | 5/2013 | Heidasch | |
| 2018/0101587 A1 | 4/2018 | Anglin et al. | |
| 2018/0232433 A1 * | 8/2018 | Kanvinde | G06F 16/25 |

* cited by examiner

*Primary Examiner* — Isaac M Woo
(74) *Attorney, Agent, or Firm* — MLO, a professional corp.

(57) ABSTRACT

A method of connecting, by a computerized system, to a database at a source is disclosed. The computerized system queries the database for data associated with a characteristic and identifies the data. The computerized system organizes the data into a batch based on business-defined rules. The batch condenses a plurality of rows of data in the database associated with the characteristic into one row of data associated with the characteristic. The computerized system transforms the batch into a packet having a text or binary ready-to-consume format and publishes the packet as a ready-to-consume business object.

20 Claims, 12 Drawing Sheets

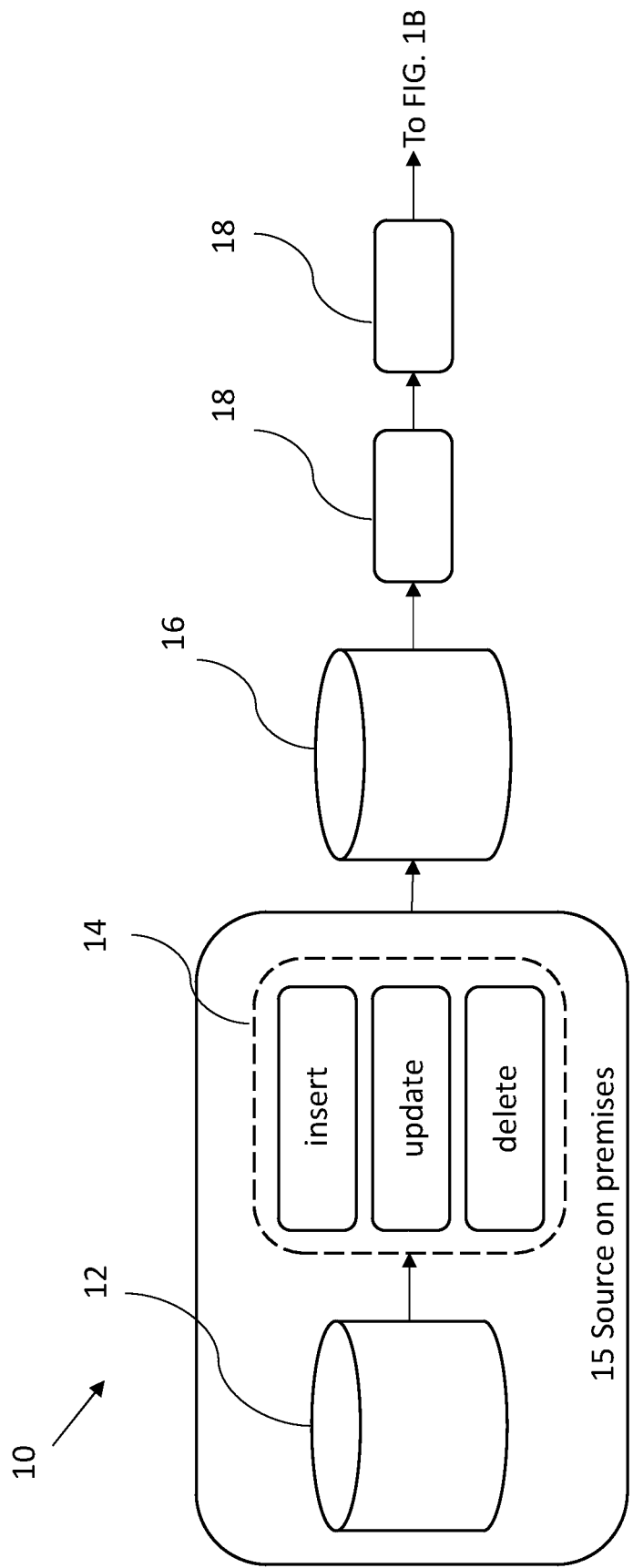
FIG. 1A – Prior Art

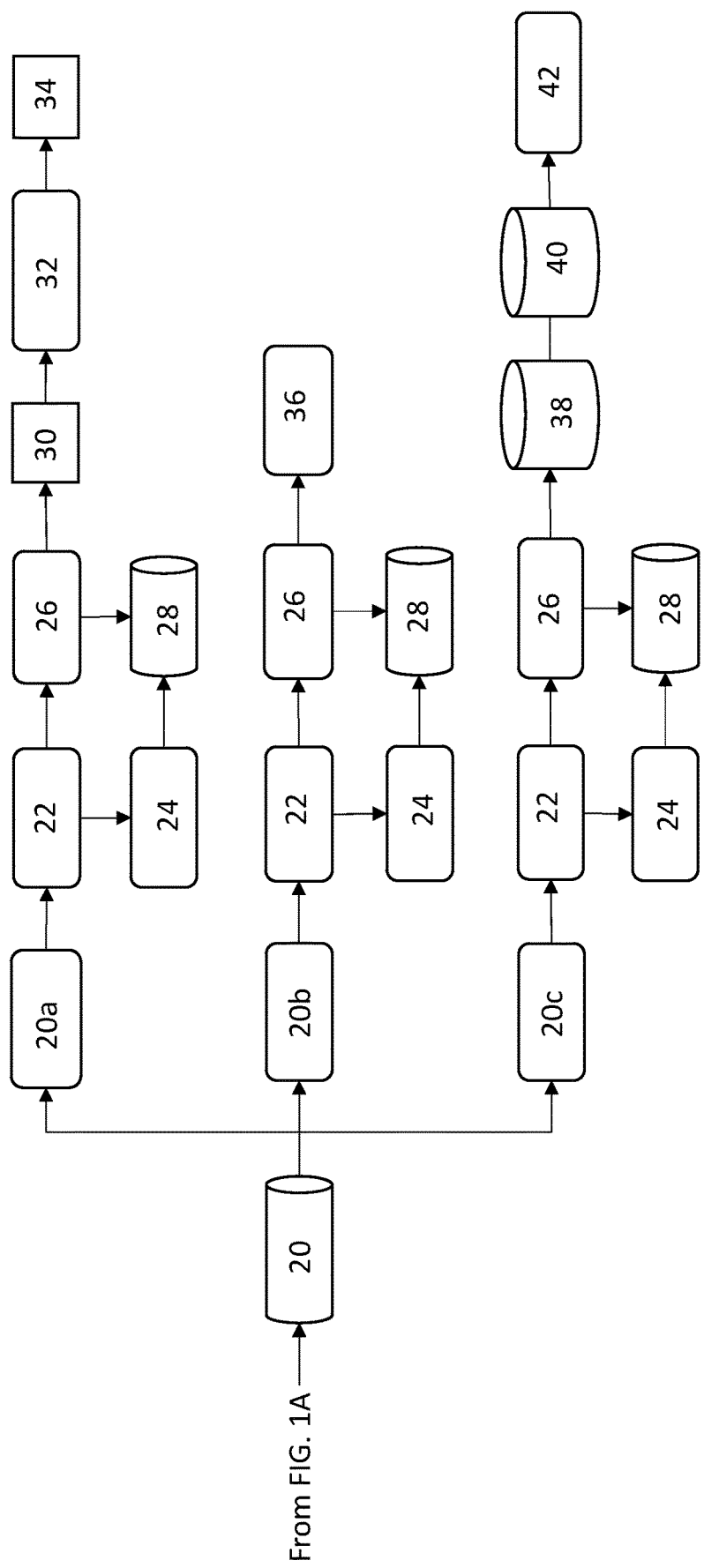
FIG. 1B – Prior Art

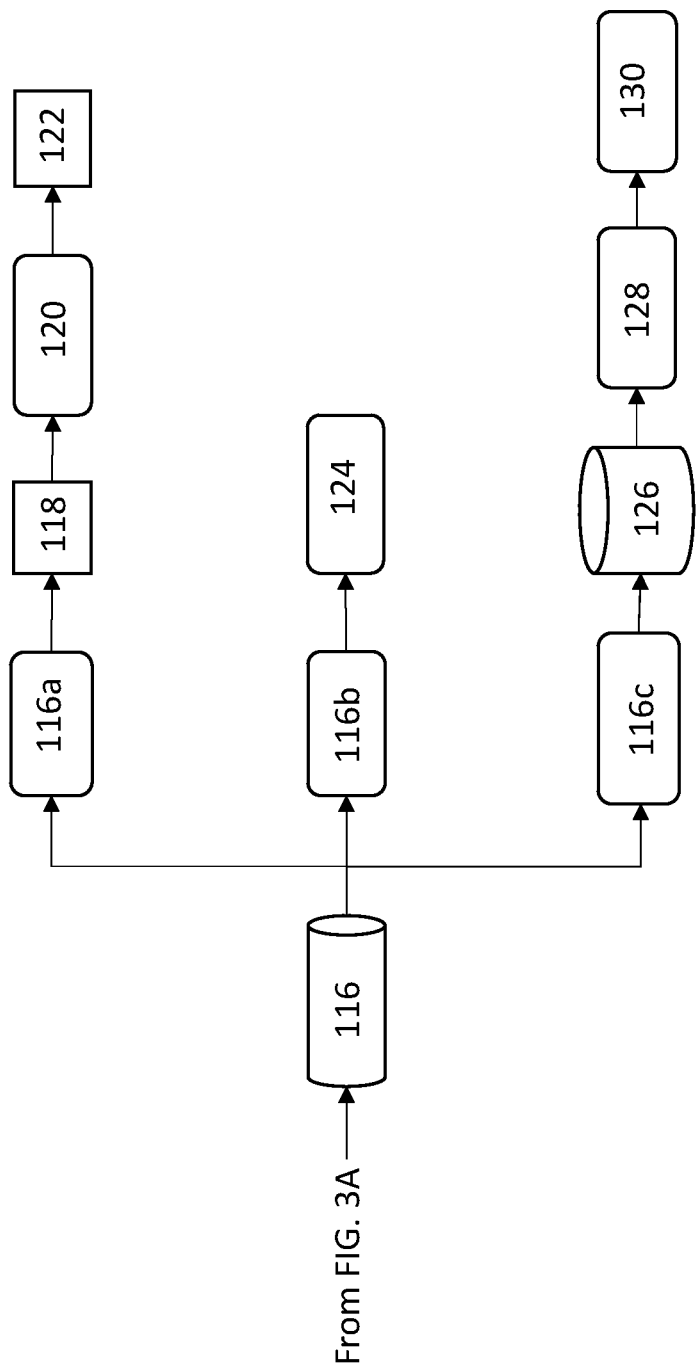

GENERATING A BUSINESS OBJECT

RELATED APPLICATIONS

This application claims priority to U.S. Provisional Application No. 63/202,937, filed on Jun. 30, 2021, and entitled "System and Method for Generation A Business Object", which is hereby incorporated by reference in full.

BACKGROUND

Transferring large amounts of data from a source to a target destination is known in the art. When the data is received at the target destination, it may be necessary to transform the data into a useable form such as a business object. Business objects are a set of objects related to one other representing data in various structures such as tables, lists, arrays, and others. The business object condenses the raw data from the source into a usable form.

The existing software in the market for transferring the data from a source to a target destination typically utilizes a log-mining solution for real-time processing or replication of the entire database several times a day. These existing solutions read the raw data from the database at the source, replicate the database, then transmit the replicated database to the target destination. At the target destination, the replicated database is transformed by a further system into the business object. The described process transfers all of the data, including changes to the data out of context, to the target destination results. At the target destination, the proper infrastructure and further systems are required to transform the database into a business object which depends on the knowledge and talent at the target destination. During the multi-stage transformation of the database to the business object by the further systems, the processing is prone to errors.

The existing software solution results in large batches of irrelevant data being transferred, analyzed and filtered at the target destination. This is time consuming, costly, adds latency to the process, bogs down the resources, and depends heavily on the processing at the target destination. Moreover, this solution is typically tightly coupled with the target destination system and may use several tools to transform the content of the databases into the business object.

SUMMARY

Some embodiments involve a method of connecting, by a computerized system, to a database located at a source. The computerized system queries the database for data associated with a characteristic and identifies the data. The computerized system organizes the data into a batch based on business-defined rules. The batch condenses a plurality of rows of data in the database associated with the characteristic into one row of data associated with the characteristic. The computerized system transforms the batch into a packet having a text or binary ready-to-consume format and publishes the packet as a ready-to-consume business object.

Some embodiments involve a computerized system of a memory storing executable instructions and a processor coupled to the memory that performs a method by executing the instructions stored in the memory. The method includes connecting, by the processor, to a database located at a source. The processor queries the database for data associated with a characteristic and identifies the data. The processor organizes the data into a batch based on business-defined rules. The batch condenses a plurality of rows of data in the database associated with the characteristic into one row of data associated with the characteristic. The processor transforms the batch into a packet having a text or binary ready-to-consume format and publishes the packet as a ready-to-consume business object.

Some embodiments involve a non-transitory computer-readable media embodying program instructions that, when executed by a processor, cause the processor to implement a method. The method includes connecting, by the processor, to a database located at a source. The processor queries the database for data associated with a characteristic and identifies the data. The processor organizes the data into a batch based on business-defined rules. The batch condenses a plurality of rows of data in the database associated with the characteristic into one row of data associated with the characteristic. The processor transforms the batch into a packet having a text or binary ready-to-consume format and publishes the packet as a ready-to-consume business object.

BRIEF DESCRIPTION OF THE DRAWINGS

FIGS. 1A and 1B are flowcharts of a conventional, prior art solution for transferring data at a source to a target destination.

FIGS. 3A and 3B are flowcharts for transferring data from a source to a target destination, in accordance with some embodiments.

DETAILED DESCRIPTION

Figure 2A:
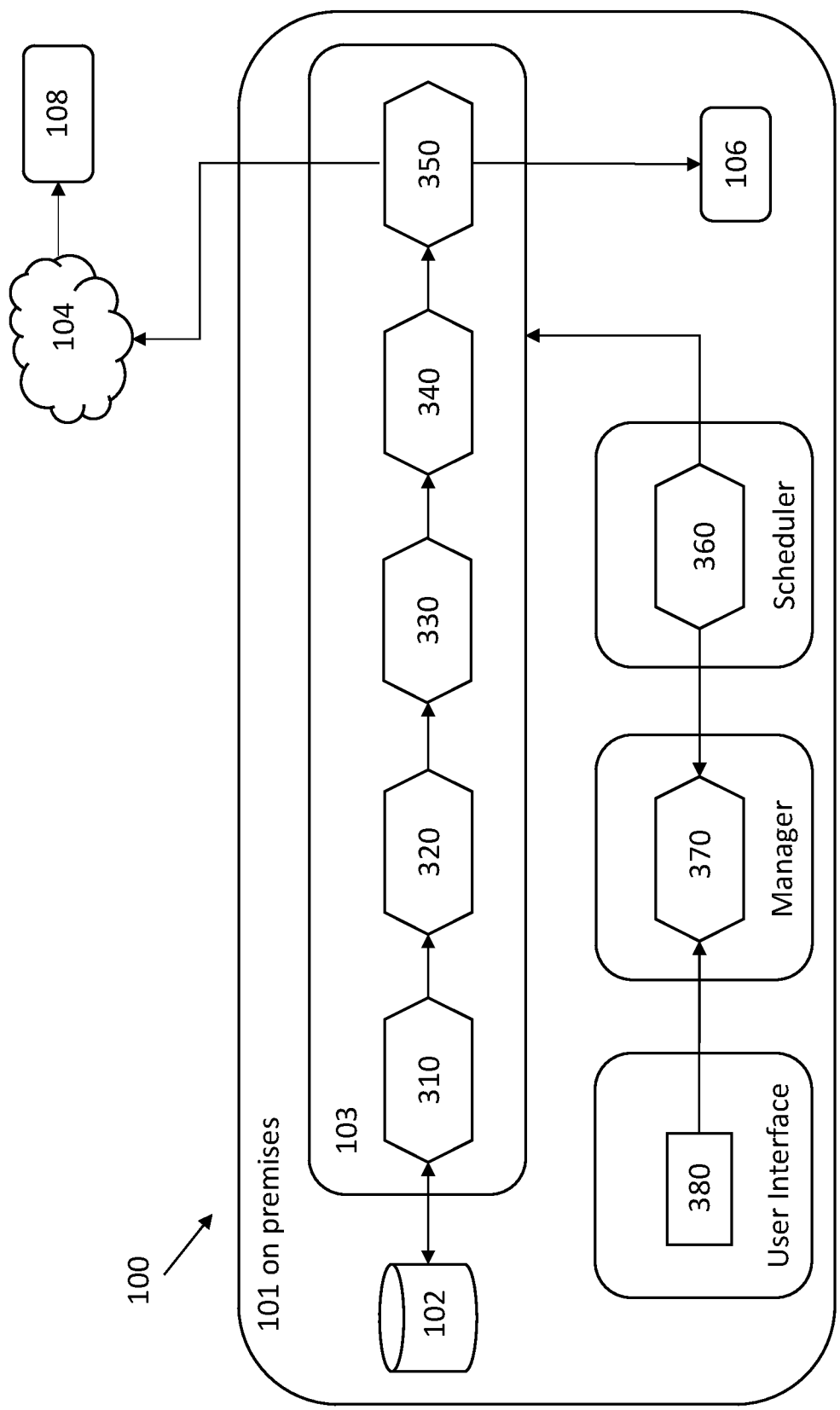
FIG. 2A is a schematic of an environment for a system and a method, in accordance with some embodiments.

In some embodiments, large amounts of data are seamlessly transferred in near-real-time from a source to a target destination in a cost-effective, business-oriented, reliable, and secure way. In the present embodiments, data is extracted from a database at the source with SQL queries provided by the consumer or client. The results are organized into batches and transformed into a ready-to-consume business object at the source which is then published to a messaging platform. The messaging platform makes the ready-to-consume business object available to the consumer or transmits the ready-to-consume business object to the target destination. The ready-to-consume business object may be consumed by the consumer without further processing, as soon as it reaches the target destination since all of the processing is performed at the source at the time of reading the database.

Thus, there is no need to replicate or transform the data at the target destination as commonly done in conventional software systems. In other words, all of the processing and transformation is done on the data at the source to generate the ready-to-consume business object before it is transferred. The source databases are read at the source only once which minimizes the workload on the source system. The business objects may be consumed or used at the target destination as many times as needed.

The present embodiments allow a constant flow of packets of ready-to-consume business objects to any target destination at a fraction of the cost of current software solutions for transferring data. The packages containing the ready-to-consume business objects are customizable in size and grouping algorithm, marshaled for optimized transfer over a network thereby reducing the overall number of messages or traffic between the source and the target destination. The packages may be enriched with metadata that describes the non-sensitive part of the content. The transfer is secure from an unauthorized consummation through encryption, and only the originating owner of the data has access to the content throughout the process.

Some traditional solutions for transmitting data from a source to a target destination involve reading the database at the source, replicating the read database, transmitting the replicated database to the consumer, then analyzing and transforming the database at the consumer. Change Data Capture (CDC) software is one traditional approach to transferring data to a target destination. This approach is near real-time movement of data from relational databases to data warehouses, data lakes or other databases. CDC is a process where each and every adjustment to the source data is copied to a destination. For example, (i) one row of data is added to the source database, (ii) the one row of data is updated, and finally, (iii) the one row of data is deleted. The CDC solution records three transactions to correctly replicate this activity which is all transmitted to the target destination. Obviously, this is all irrelevant data since, in this example, the data was added and deleted having no net difference. By doing so, a large number of events, most of which are not seen or used by the consumer and are thereby irrelevant, are transferred.

Extract, Transform, Load (ETL) is a data integration process in which data is extracted from various sources and delivered to a data warehouse, database, or data lake, preparing it for consumption. To accomplish this, multiple batch processes have to be set up to extract the right data together and transform it. The final step of ETL involves loading data into the target destination. The ETL process is very complex, needs to be carefully orchestrated, and has tightly coupled systems with a lot of dependencies. Unfortunately, because of the batch processing, the transformed data outcome is never the most up-to-date version.

The cost of ownership and administration for CDC and ETL systems are high, and neither of those solutions transform the data at the source. This means the database at the source is read multiple times a day and large packets of information are sent bogging down and slowing down the infrastructure and system. The responsibility for the transformation is at the target destination where the source data is not necessarily understood by the target destination. This can severely impact the integrity of the results.

FIGS. 1A and 1B are flowcharts of a conventional, prior art solution for transferring data at a source to a target destination. Referring to FIG. 1A, the prior art solution 10 has a database 12 and CDC software 14 at the source on premises 15. The CDC software 14 may track inserts, updates and deletes to data. The database is replicated to a replication database segment 16. The replicated database may undergo several processes in various segments 18 such as scheduled pulls and logic, and publisher functions. Continuing in FIG. 1B, the replicated database arrives at the consumer 20 site. In some examples, the consumer may be an analytics consumer 20a, a business consumer 20b (also referred to as operational consumer or consumer of operational data) or an API data backend consumer 20c. Each of these consumers 20a, 20b and 20c are not located at the source on premises 15, and the received replicated database in its current form is not useable. Rather, the replicated database must be transformed by a series of complex segments to create the ready-to-consume business object at the target designation and at the responsibility of the consumer.

For example, referring to the analytics consumer 20a, business consumer 20b and API data backend consumer 20c, a raw data archiver segment 22 (e.g., data persistence), a replay/resubmission mechanism segment 24, a custom schema validator segment 26, and a consumer topic 28 are included. In analytics consumer 20a, after the custom schema validator segment 26, there is an Extract-Transform-Load or Extract-Load-Transform (ETL/ELT) segment 30, an analytics platform segment 32, and the flow ends with an analytics user tooling 34. In business consumer 20b, after the custom schema validator segment 26, the flow ends in an operation or transactional data consumer 36. In the API data backend consumer 20c, after the custom schema validator segment 26, there is a regional database 38, a cache layer 40, and the flow ends with an API data consumer 42. At the end of these detailed and complicated segments, the ready-to-consume business object is created at the consumer site.

In contrast, the present embodiments enable the system and associated methods thereof to generate the ready-to-consume business object at the source. As such, the database at the source is queried for relevant data and then that data is transformed to the ready-to-consume business object at the source. There is no need to copy and transmit databases to another destination for processing and transformation to the ready-to-consume business object. The system enables a constant stream of ready-to-consume business objects to the target destination, decoupling the database from the source and accelerating digital transformation.

FIG. 2A is a schematic of an environment for a system and a method, in accordance with some embodiments. A computerized system 100 may be located on premises 101 with a source database 102 and a business data publisher 103. The computerized system 100 may be an enterprise system which may be a computer, a group of computers, a server, a server farm or a cloud computing system. The hardware generally includes any appropriate number and combination of computing devices, network communication devices, and peripheral components connected together, including various processors, computer memory (including transitory and non-transitory media), input/output devices, user interface devices, communication adapters, communication channels, etc. The software generally includes any appropriate number and combination of conventional and specially-developed software with computer-readable instructions stored by the computer memory in non-transitory computer-readable or machine-readable media and executed by the various processors to perform the functions described herein. The system includes an internal network through which internal communication devices, such as personal computers, laptop computers, tablets, mobile phones, landline phones, smartwatches, smart cars, or the like, operated by a user, communicate. In these implementations, the computerized system 100 includes traditional hardware such as a memory storing executable instructions, and a processor coupled to the memory.

The source database 102 is an organized collection of data stored and accessed electronically by the system. The source database 102 may be one or more databases stored on dedicated hardware or servers that run related software. In some embodiments, database servers are multiprocessor computers, with abundant memory and Redundant Array of Independent Disks (RAID) disk arrays used for stable storage. The computerized system 100 communicates through the internal network (not shown) and may publish data, such as a ready-to-consume business object, to an internal message platform 106 on premises 101. The computerized system 100 communicates with entities outside of the premises through the cloud/internet 104. For example, the computerized system 100 may publish data, such as a ready-to-consume business object, to a message broker 108 via the cloud/internet 104.

Message brokers 108 are often used to manage communications between on-premises systems and cloud systems. A message broker 108 may be software that enables applications, systems, and services to communicate with each other and exchange information. The message broker 108 does this by translating messages between formal messaging protocols which allows interdependent services to "talk" with one another directly, even if they were written in different languages or implemented on different platforms. Message brokers 108 can validate, store, route, and deliver messages to the appropriate destinations. They serve as intermediaries between other applications, allowing senders to issue messages without knowing where the receivers are, whether or not they are active, or how many of them there are. This facilitates decoupling of processes and services within systems. The computerized system 100 includes the business data publisher 103 having modules, such as a fetcher module 310, formatter module 320, serializer module 330, encrypter module 340, publisher module 350, scheduler module 360, manager module 370 and user interface module 380. These modules 310-380 are located on premises 101 and are described with reference to FIGS. 4-7.

Figure 2B:
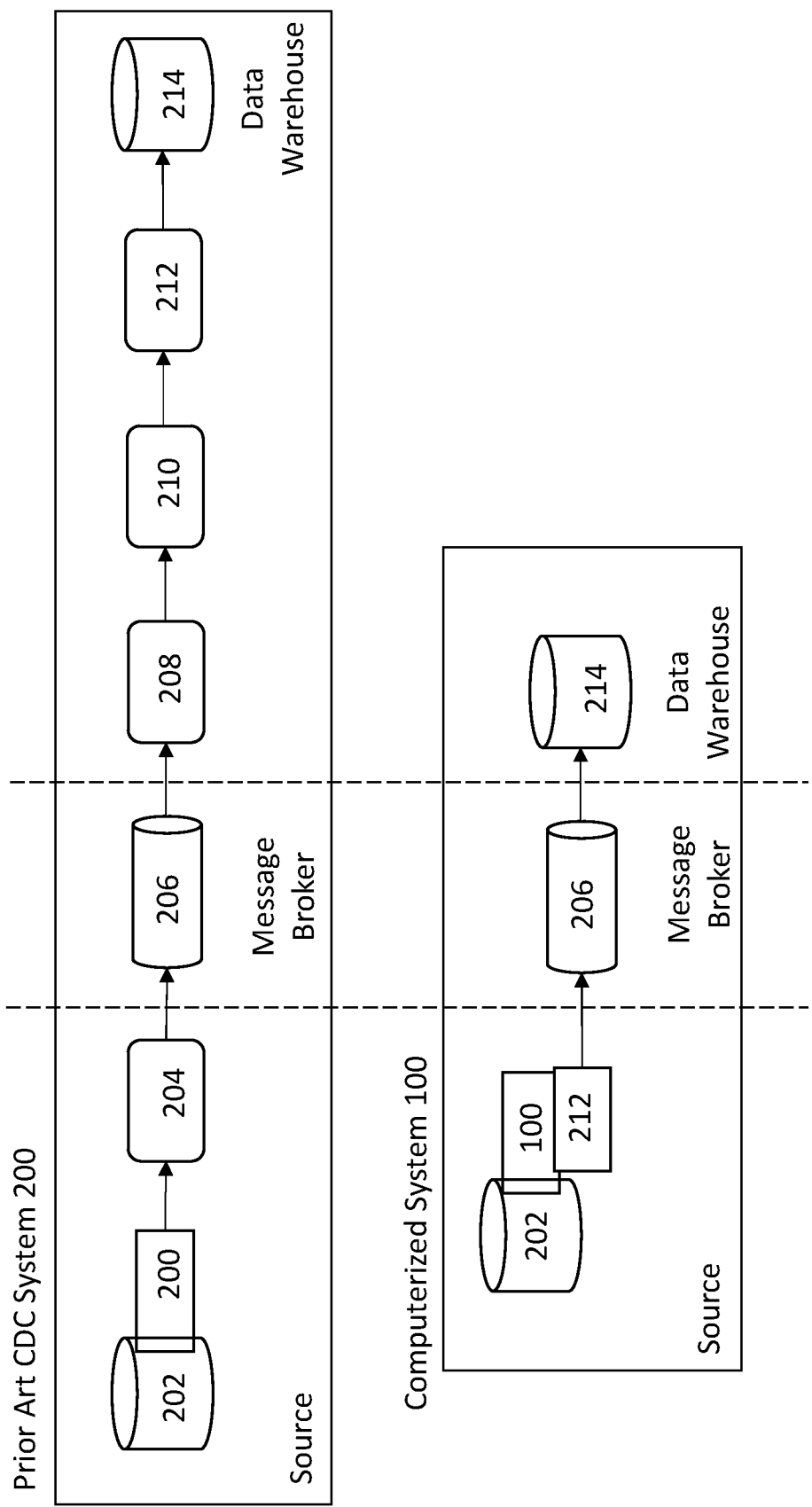
FIG. 2B compares a schematic of a typical CDC system to a schematic of the computerized system with the business data publisher, in accordance with some embodiments.

FIG. 2B compares a schematic of a typical CDC system to a schematic of the computerized system 100 with the business data publisher. The CDC system 200 is a common method of extracting data from a source system where changes are captured via log files to replicate databases. For example, in the schematic for the CDC system 200, data is extracted from the regional database management system 202 and a log collector 204 captures the data of additions, deletions and changes at the source. This is sent to a message broker 206. From there, the data undergoes a complex transformation starting at a log consumer 208 then to a target or destination regional database management system 210. The business object 212 is finally generated and available at a data warehouse service 214. In contrast, in the schematic for the computerized system 100 with the business data publisher, data is extracted from the regional database management system 202 and the business object 212 is generated at the source. This is sent to a message broker 206 and is then made available at a data warehouse service 214. In this way, the business object is created at the source and the transformation of the data to the business object happens at the source for a real-time system. This avoids complexity and poor performance of CDC systems. Since the data is serialized and compressed, this reduces network traffic and increases speed. The encryption of the data provides security while both public internet and private networks can be used.

Figure 3A:
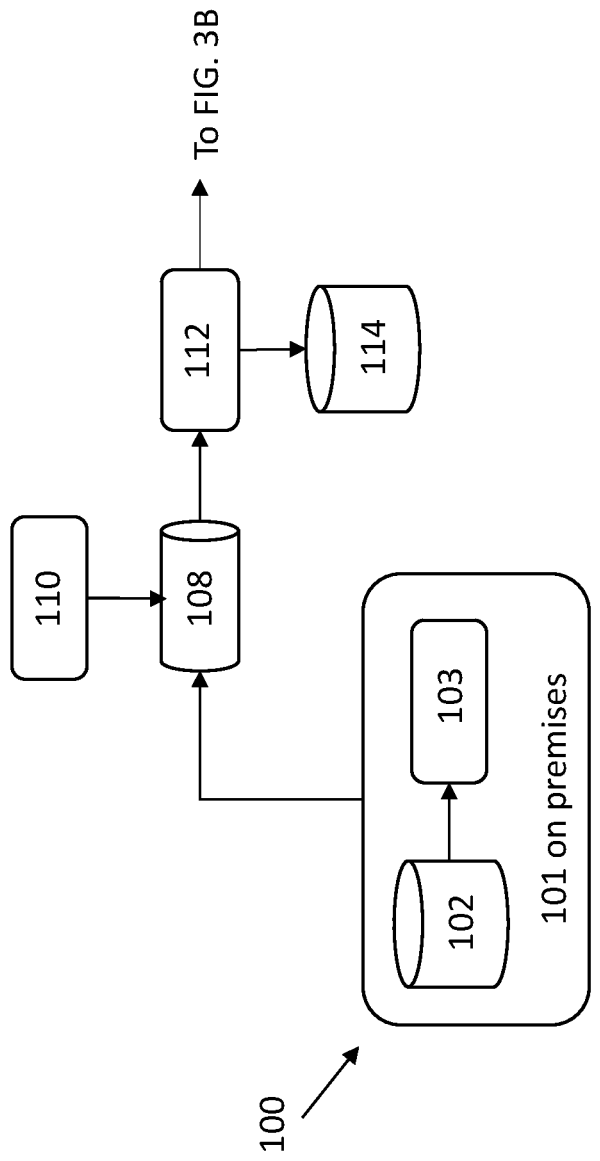

FIGS. 3A and 3B are flowcharts for transferring data from a source to a target destination, in accordance with some embodiments. In FIG. 3A, the computerized system 100 is located on premises 101 with the database 102. The system queries the database 102 for relevant data, enriches that data with the needed metadata, and generates a ready-to-consume business object. The business object is a data record. In conventional use in a relational database as known in the art, data is split into different tables and referenced as needed. This means that the data is incomplete for a specific table within the database. The embodiments herein create a business object by pulling data from all the relevant tables in the database 102 to make a complete record. As an example, in a sales database there may be a table of customers and another table of invoices. When the invoice data is pulled out of the invoice table, there may be only a reference to the customer such as the customer ID. This is generally not usable because data is missing. Instead of the reference to the customer, it would be useful to have the name of the customer and corresponding company as well as the invoice information. All of the data is joined together in the generated business object, which is an actionable and usable business object without any further processing needed. Usable business objects may be associated with object schema—structure of data objects, columns and types—and serialized with the object schema into several standardized serialization formats such as JSON, Avro or Protobuf.

The creation of the ready-to-consume business object occurs on premises 101 and at the source. The computerized system 100 publishes the ready-to-consume business objects on the message broker 108 decoupling the data/ready-to-consume business objects from the source. The message broker 108 may be utilized by a variety of data producers 110. The data producers 110 may be other independent systems that publish content on the message broker. For example, the message broker 108 can support information from a variety of data producers 110. In some embodiments, a schema registry 112 or janitor component ensures that the data schema is always up-to-date so that the consumers of the data never miss new attributes. As soon as the data producer 110 sends new attributes or a new order, the schema registry 112 transmits a notification to the data producer 110 or data engineers to notify them of the changes. In this way, the data producer 110 can verify if the sent data is correct or the data engineer can act on the change almost immediately. Previous schema versions are stored in schema history 114 in an easily navigable way, so retrieving data of a previous set up is possible.

In FIG. 3B, the ready-to-consume business object is received by the consumer 116. In some embodiments, the consumer 116 may be an analytics consumer 116a, business consumer 116b, or a persistent storage consumer 116c. In the analytics consumer 116a, there may be an Extract/Transform/Load (ETL) or Extract/Load/Transform (ELT) segment 118 performed on the ready-to-consume business object. ETL is an integration approach that pulls information from remote sources, transforms it into defined formats and styles, then loads it into databases, data sources, or data warehouses. ELT similarly extracts data from one or multiple remote sources, but then loads it into the target data warehouse without any other formatting. Continuing in the flowchart, there may be an analytics platform segment 120, ending with an analytics user tooling 122. In some embodiments, the consumer may be a business consumer 116b with an operational or transactional data consumer 124. In some embodiments, the consumer may be a persistent storage 116*c*. The persistent storage 116*c* is a component that collects and stores the received data in storage 126, such as the ready-to-consume business object in an accessible way, in its original format. In this way, the persistent storage 116*c* stores the data from the data producers 110 so that backups are not needed from the data producer 110. There may be an API Gateway 128 ending with an API data customer 130.

Figure 4:
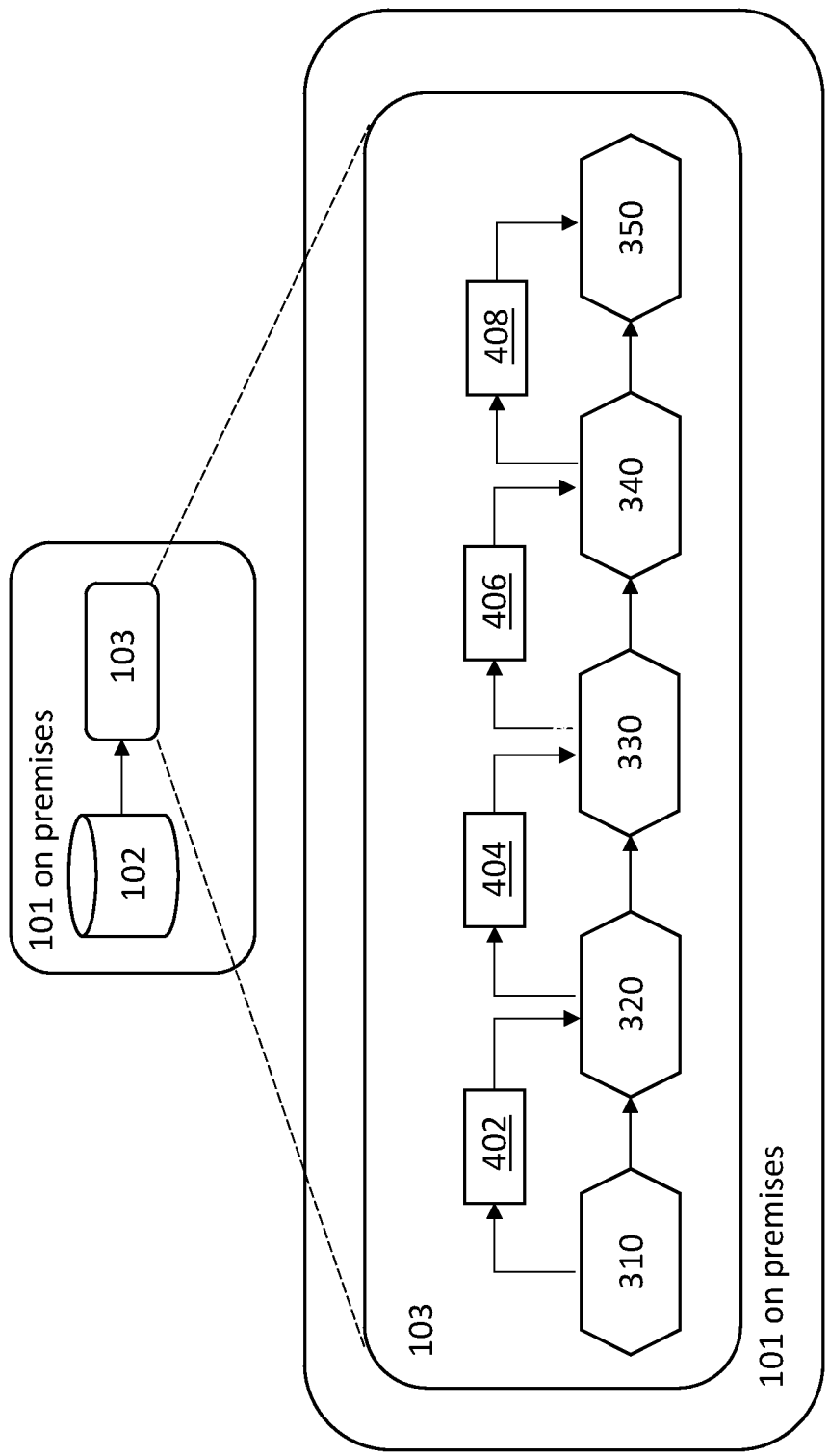
FIG. 4 shows a schematic of the modules of the business data publisher of computerized system, in accordance with some embodiments.

FIG. 4 shows a schematic of the modules of the business data publisher 103 of computerized system 100, in accordance with some embodiments. In conventional systems for transferring data from a source to a target destination, databases at the source are replicated several times a day and every change that occurs is sent to the target destination. This results in sending large baches of business-irrelevant data to the cloud platform. The computerized system 100 described in the present embodiments, in contrast, transforms the data from the database 102 to the ready-to-consume business object at the source or on premises 101, so only the relevant information is transmitted instead of extraneous data without context. The database 102 and the business data publisher 103 are located on premises 101. The business data publisher 103 may include modules, such as a fetcher module 310, formatter module 320, serializer module 330, encrypter module 340 and publisher module 350. FIG. 2A also shows the modules 310, 320, 330, 340 and 350 of the business data publisher 103 of the computerized system 100.

Figure 5:
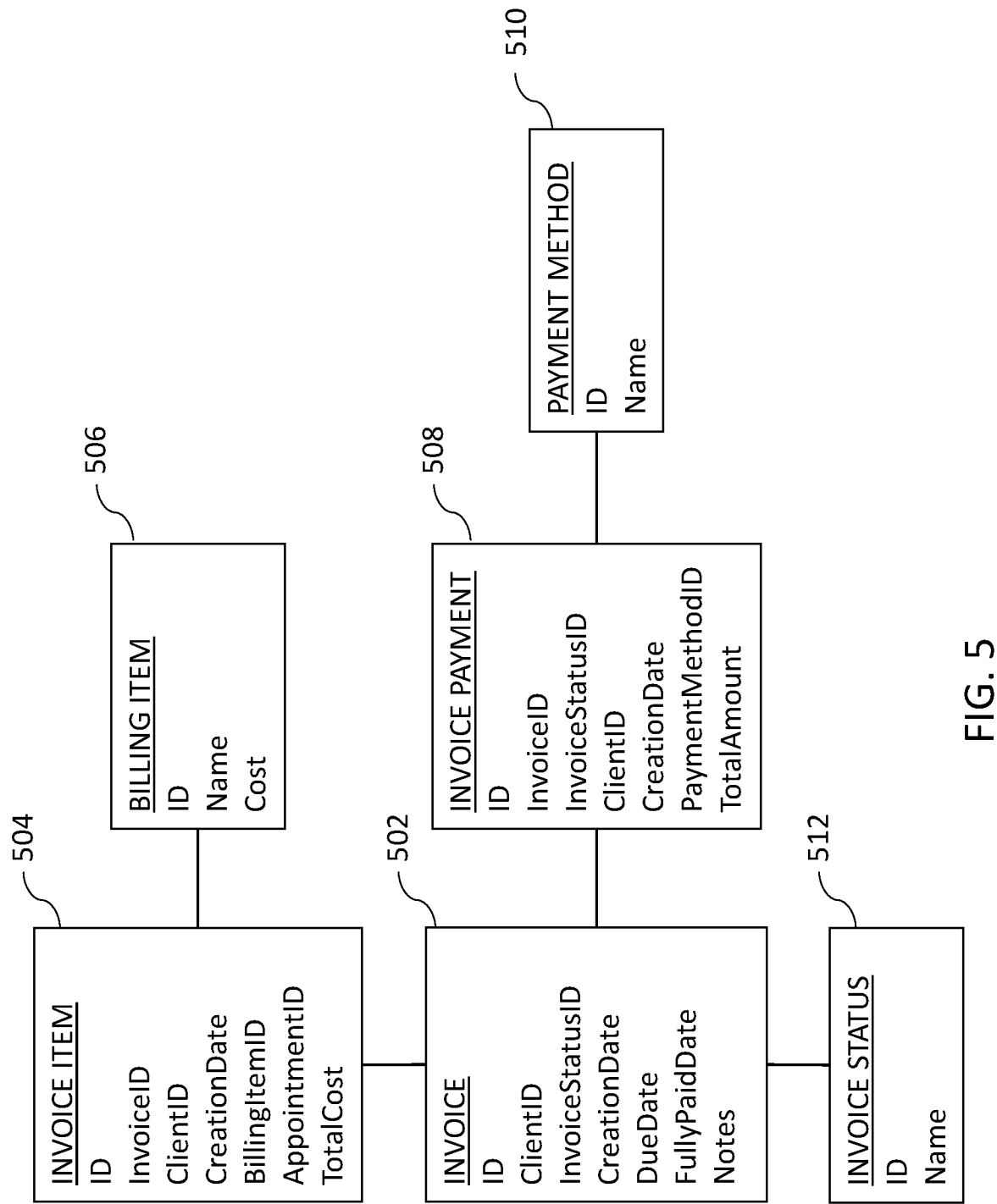
FIG. 5 is an example query by the fetcher module, in accordance with some embodiments.

The fetcher module 310 of the business data publisher 103 connects to the database 102 at the source, or on premises 101. In some embodiments, the database 102 source is Java Database Connectivity (JDBC) compliant. The fetcher module 310 queries the database 102 for data associated with a characteristic or information of the characteristic. In some embodiments, the querying comprises queries having incremental Structured Query Language (SQL). For example, FIG. 5 is an example query by the fetcher module 310, in accordance with some embodiments. The query focuses on data associated with a characteristic or information of the characteristic. For example, for an "INVOICE" query, the results show invoice 502 with the corresponding information relating data that describes the transaction. The query may include the invoice item 504, billing item 506, invoice payment 508, payment method 510, and invoice status 512.

Figure 6:
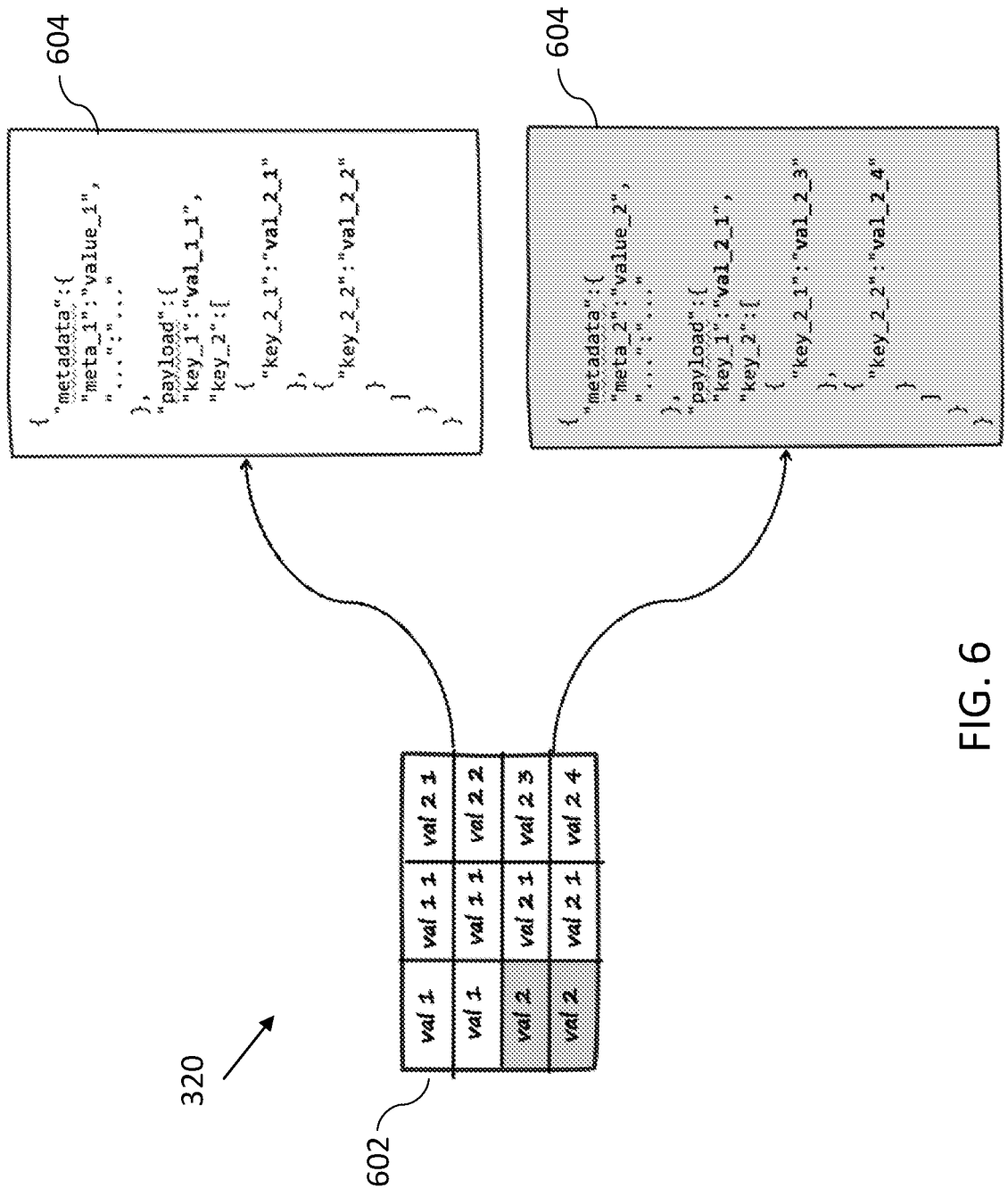
FIG. 6 is an example schematic of condensing data, in accordance with some embodiments.

The data or result from the query from the fetcher module 310 may be any appropriate number (e.g., thousands or millions) of rows of data. At block 402 of FIG. 4, the data or result is sent to the formatter module 320. The formatter module 320 of the of the business data publisher 103 condenses the data from the query in batch, with parallel threads. Batch processing may be used to process the data, such as the transactions, in a group or batch without user interaction. FIG. 6 is an example schematic of condensing data, in accordance with some embodiments. The formatter module 320 takes raw data 602 coming from fetcher module 310 and converts it into an end-result message 604 containing metadata such as a header, and payload in a key-value format. For example, the formatter module 320 may condense multiple rows of raw data 602 associated with a characteristic or information of the characteristic into a single row of data based on business-defined rules. This decreases the number of messages being published to, for example, the message broker 108 while preserving the context of the data. The business-defined rules may include transactions made by a particular client, transactions made on one day, transactions made with a particular payment method, or any combination thereof. The business-defined rules may be any matter to categorize the data. At block 404 of FIG. 4, the end-result message 604 from the formatter module 320 is sent to the serializer module 330.

Figure 7:
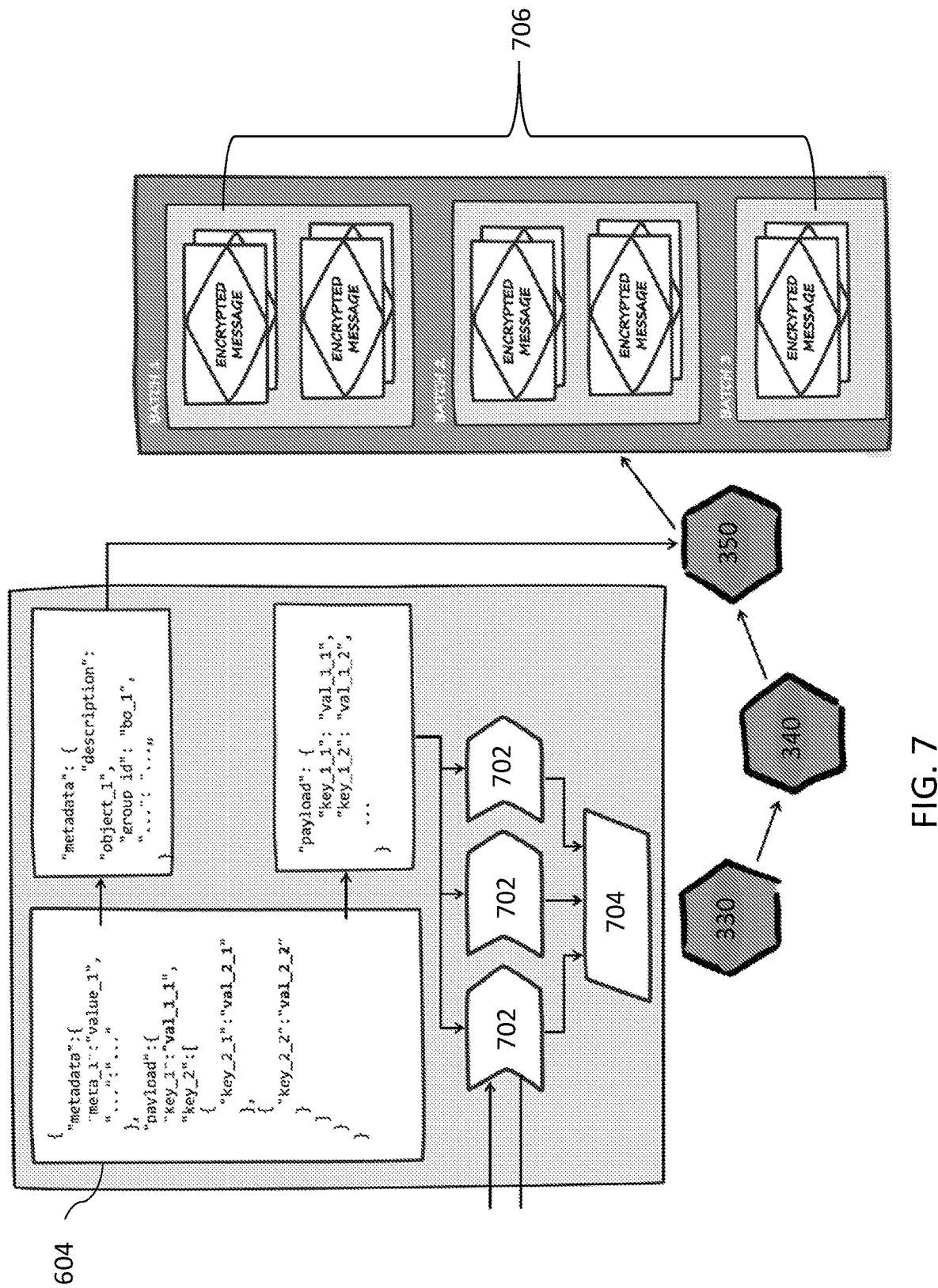
FIG. 7 is a schematic of some of the modules of the business data publisher of the computerized system, in accordance with some embodiments.

FIG. 7 is a schematic of some of the modules of the business data publisher 103 of the computerized system 100, in accordance with some embodiments. The serializer module 330 of the of the business data publisher 103 transforms the batch data from the formatter module 320 into a different format capable of being stored or transmitted, and also reconstructed at a different point. The different format 702 may be an industry-standard such as a text or binary ready-to-consume format of JSON, Avro or Protobuf. This is the ready-to-consume business object as a serialized message 704. At block 406 of FIG. 4, the serialized message 704—the business object—is sent to the encrypter module 340.

The encrypter module 340 of the computerized system 100 encodes or encrypts the serialized message as a security measure so the data cannot be accessed until decryption. In this way, the transmission is secure from an unauthorized consummation and only the originating owner of the data has access to the content throughout the process. At block 408 of FIG. 4, the encrypted message 706 is sent to the publisher module 350.

The publisher module 350 of the business data publisher 103 may enrich the serialized message 704/encrypted message 706 with metadata that provides information about the serialized message 704/encrypted message 706, e.g., the ready-to-consume business object. The metadata may include descriptive metadata, structural metadata, administrative metadata, reference metadata, statistical metadata and legal metadata depending on the particular message broker or consumer. The publisher module 350 publishes the serialized message 704/encrypted message 706, e.g., the ready-to-consume business object, to the on-premises message platform 106 or to the message broker 108 via the cloud/internet 104. The serialized messages 704/encrypted messages 706 may be grouped or batched for efficiency and published to the message platform 106 or the message broker 108. This creates a stream of real-time ready-to-consume business objects ready for direct consumption.

Figure 8:
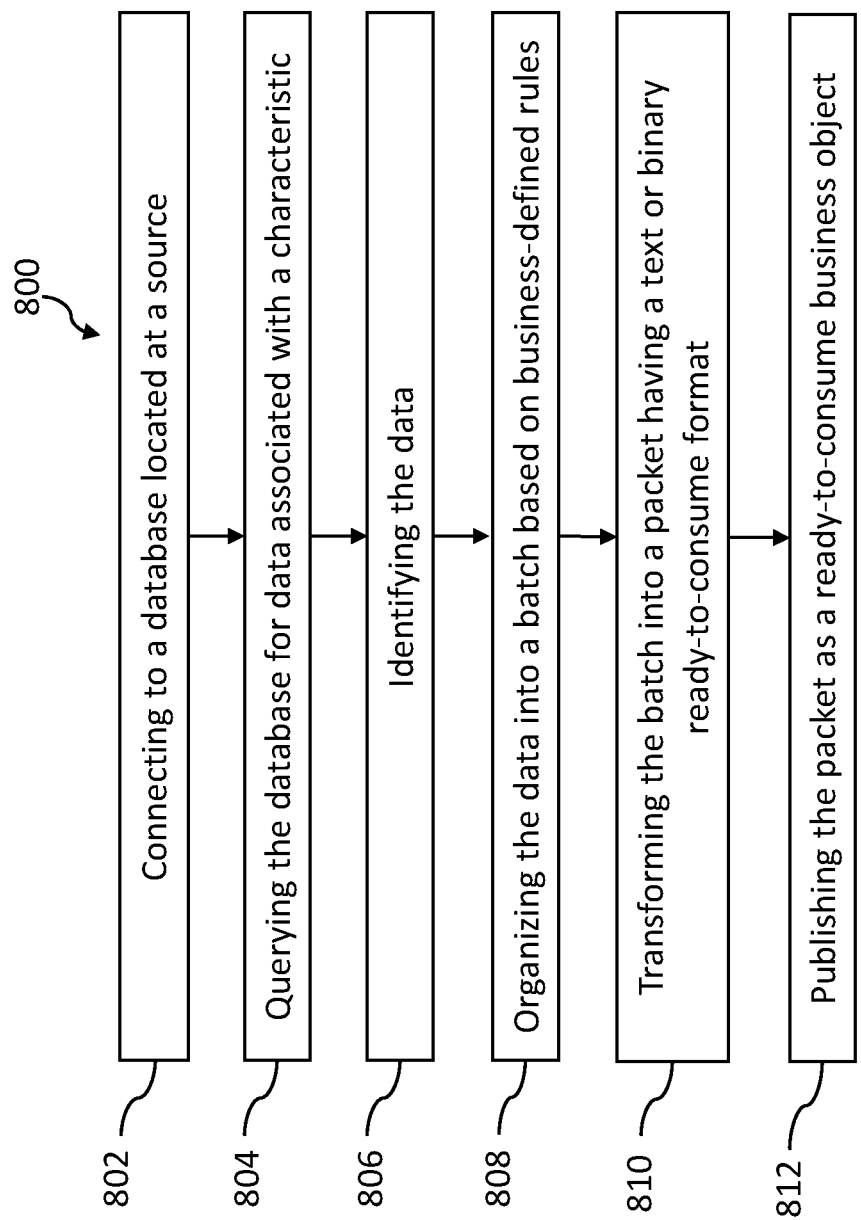
FIG. 8 is a method for generating a business object performed by the computerized system, in accordance with some embodiments.

FIG. 8 is a method for generating a business object performed by the computerized system, in accordance with some embodiments. The method 800 for generating a business object includes the modules, such as the fetcher module 310, formatter module 320, serializer module 330, encrypter module 340 and publisher module 350, as described herein. The method 800 starts at block 802, by connecting to a database located at a source. The database source may be Java Database Connectivity (JDBC) compliant. At block 804, the database is queried for data associated with a characteristic. The querying comprises queries having incremental Structured Query Language (SQL). At block 806, the data is identified. At block 808, the data is organized into a batch based on business-defined rules. The batch condenses a plurality of rows of data in the database 102 associated with a characteristic into one row of data associated with the characteristic. At block 810, the batch is transformed into a packet having a text or binary ready-to-consume format. The text or binary format may be JSON, Avro or Protobuf. At block 812, the packet is published as a ready-to-consume business object. In some embodiments, the packet is encrypted before publishing.

Once the packet, e.g., the ready-to-consume business object, is published, the ready-to-consume business object is decoupled from the database 102 at the source on premises 101. The ready-to-consume business object is transmitted to the message broker 108 or message platform 106 for consumption. The message broker 108 or message platform 106 allows the ready-to-consume business object to be available to the consumer or user device. This may be accomplished by the message broker 108 or message platform 106 transmitting the ready-to-consume business object to the consumer, transmitting an alert to the consumer that the ready-to-consume business object is available, or the like. The ready-to-consume business object is then accessed by the consumer and the ready-to-consume business object can be consumed by the consumer without modifying the data of the ready-to-consume business object into a different format.

Referring to FIG. 2A, the computerized system 100 includes a scheduler module 360. The scheduler module 360 monitors the database 102 on premises 101 at the source for changes in the data in the database. When a change in the data in the database 102 is detected, the method 800 beings again at block 802 with the fetcher module 310. This process may occur several thousands of times per second which renews and publishes the ready-to-consume business object in near real-time. The computerized system 100 may include a manager module 370 to facilitate the logistics of the method 800 such as for scheduling and batch size settings. A user interface module 380 coordinates the graphical display and enhances the user experience by configuring the display and database connection information.

In some embodiments, the computerized system 100 may be on-demand, orchestrated or constant-cycle scheduled data transfer. In some embodiments, the ready-to-consume business object may be transmitted to different target destination systems, like another database or any kind of storage, such as blob storage.

In some embodiments, the computerized system 100 includes a memory for storing executable instructions and a processor. The processor is coupled to the memory that performs a method by executing the instructions stored in the memory. The method may be method 800 such as described in detail with reference to FIG. 8. Some embodiments involve a non-transitory processor-readable medium embodying program instructions that, when executed by a processor, cause the processor to implement a method. The method may be method 800 such as described in detail with reference to FIG. 8.

Figure 9:
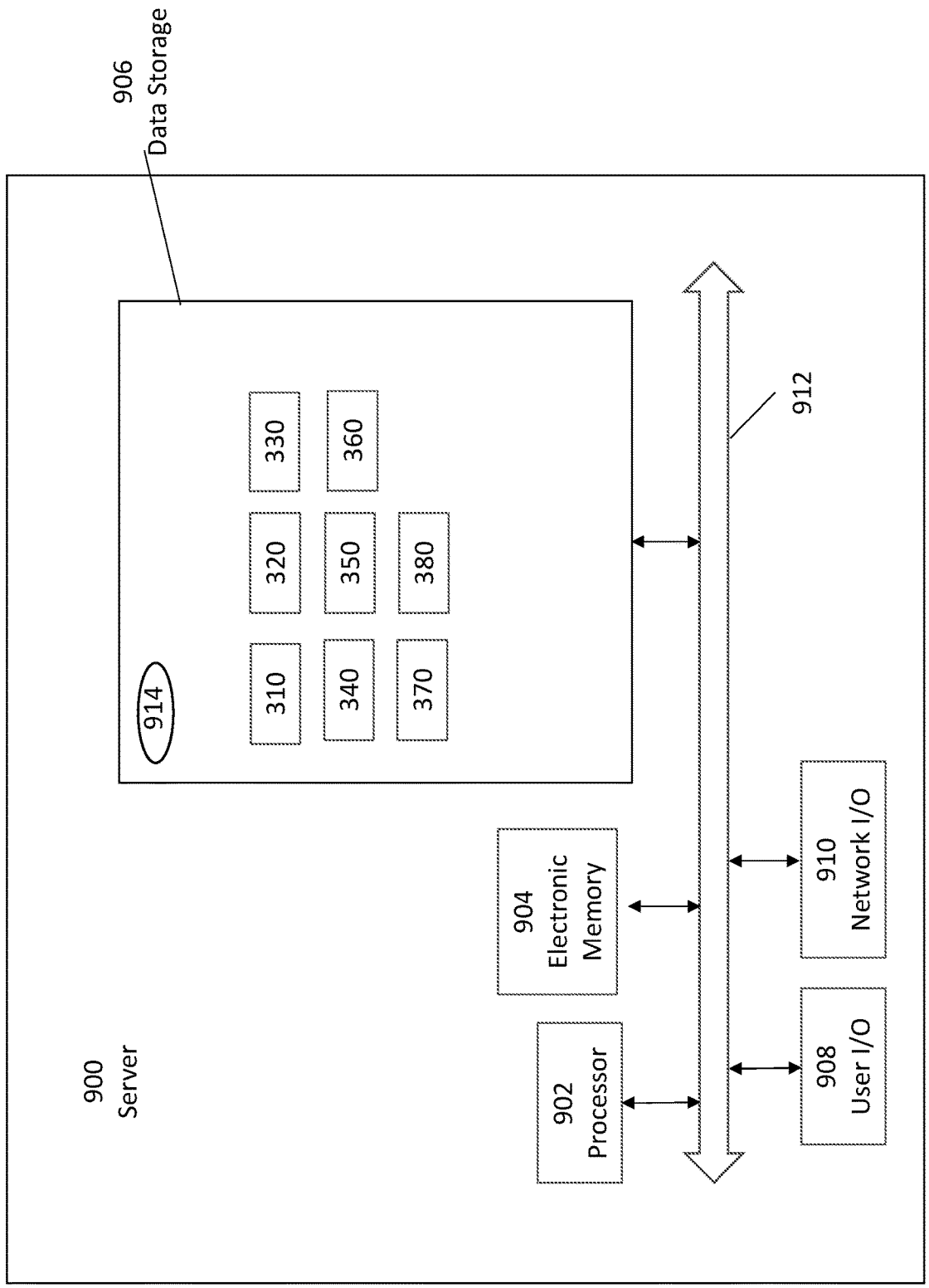
FIG. 9 is a simplified schematic diagram showing an example server for use in the system, in accordance with some embodiments.

FIG. 9 is a simplified schematic diagram showing an example server 900 (representing any combination of one or more of the servers) for use in the computerized system 100, in accordance with some embodiments. Other embodiments may use other components and combinations of components. For example, the server 900 may represent one or more physical computer devices or servers, such as web servers, rack-mounted computers, network storage devices, desktop computers, laptop/notebook computers, etc., depending on the complexity of the computerized system 100. In some embodiments implemented at least partially in a cloud network potentially with data synchronized across multiple geolocations, the server 900 may be referred to as one or more cloud servers. In some embodiments, the functions of the server 900 are enabled in a single computer device. In more complex implementations, some of the functions of the computing system are distributed across multiple computer devices, whether within a single server farm facility or multiple physical locations. In some embodiments, the server 900 functions as a single virtual machine.

In some embodiments wherein the server 900 represents multiple computer devices, some of the functions of the server 900 are implemented in some of the computer devices, while other functions are implemented in other computer devices. In the illustrated embodiment, the server 900 generally includes at least one processor 902, a main electronic memory 904, a data storage 906, a user I/O 908, and a network I/O 910, among other components not shown for simplicity, connected or coupled together by a data communication subsystem 912.

The processor 902 represents one or more central processing units on one or more PCBs (printed circuit boards) in one or more housings or enclosures. In some embodiments, the processor 902 represents multiple microprocessor units in multiple computer devices at multiple physical locations interconnected by one or more data channels. When executing computer-executable instructions for performing the above described functions of the server 900 in cooperation with the main electronic memory 904, the processor 902 becomes a special purpose computer for performing the functions of the instructions.

The main electronic memory 904 represents one or more RAM modules on one or more PCBs in one or more housings or enclosures. In some embodiments, the main electronic memory 904 represents multiple memory module units in multiple computer devices at multiple physical locations. In operation with the processor 902, the main electronic memory 904 stores the computer-executable instructions executed by, and data processed or generated by, the processor 902 to perform the above described functions of the server 900.

The data storage 906 represents or comprises any appropriate number or combination of internal or external physical mass storage devices, such as hard drives, optical drives, network-attached storage (NAS) devices, flash drives, etc. In some embodiments, the data storage 906 represents multiple mass storage devices in multiple computer devices at multiple physical locations. The data storage 906 generally provides persistent storage (e.g., in a non-transitory computer-readable media or machine-readable medium 914) for the programs (e.g., computer-executable instructions) and data used in operation of the processor 902 and the main electronic memory 904.

In some embodiments, the programs and data in the data storage 906 include, but are not limited to, several modules for preforming a method. For example, the data storage 906 includes the fetcher module 310, formatter module 320, serializer module 330, encrypter module 340, publisher module 350, scheduler module 360, manager module 370 and user interface module 380, among other programs and data. Under control of these programs and using this data, the processor 902, in cooperation with the main electronic memory 904, performs the above described functions for the server 900.

The user I/O 908 represents one or more appropriate user interface devices, such as keyboards, pointing devices, displays, etc. In some embodiments, the user I/O 908 represents multiple user interface devices for multiple computer devices at multiple physical locations. A system administrator, for example, may use these devices to access, setup and control the server 900.

The network I/O 910 represents any appropriate networking devices, such as network adapters, etc. for communicating through the computerized system 100. In some embodiments, the network I/O 910 represents multiple such networking devices for multiple computer devices at multiple physical locations for communicating through multiple data channels.

The data communication subsystem 912 represents any appropriate communication hardware for connecting the other components in a single unit or in a distributed manner on one or more PCBs, within one or more housings or enclosures, within one or more rack assemblies, within one or more geographical locations, etc.

The server 900 includes a memory storing executable instructions (loaded from the data storage 906) and the processor 902. The processor 902 is coupled to the memory 904 and performs the methods by executing the instructions stored in the memory 904. The non-transitory computer-readable media 914 includes instructions (i.e., the modules 310-380 described above) that, when executed by the processor 902, cause the processor 902 to perform operations including the method 800 as described herein.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
    connecting, by a computerized system, to a database at a source;
    querying, by the computerized system, the database for data associated with a characteristic;
    identifying, by the computerized system, the data;
    organizing, by the computerized system, the data into a batch at the source based on business-defined rules, wherein the batch condenses a plurality of rows of data in the database associated with the characteristic into one row of data associated with the characteristic;
    transforming, by the computerized system, the batch into a packet having a text or binary ready-to-consume format at the source; and
    publishing, by the computerized system, the packet as a ready-to-consume business object.

2. The method of claim 1, further comprising:
    transmitting, by the computerized system, the ready-to-consume business object to a message broker, wherein the ready-to-consume business object is decoupled from the database at the source; and
    transmitting, by the message broker, the ready-to-consume business object to a user device.

3. The method of claim 1, further comprising:
    accessing, by a user device, the ready-to-consume business object; and
    consuming, by the user device, the ready-to-consume business object without modifying the data of the ready-to-consume business object into a different format.

4. The method of claim 1, further comprising:
    monitoring, by the computerized system, the database at the source for changes in the data in the database;
    detecting, by the computerized system, a change in the data in the database; and
    connecting, by the computerized system, to the database at the source and repeating the method of claim 1.

5. The method of claim 1, further comprising encrypting, by the computerized system, the packet before the publishing.

6. The method of claim 1, wherein the database at the source is Java Database Connectivity (JDBC) compliant.

7. The method of claim 1, wherein the querying comprises queries having incremental Structured Query Language (SQL).

8. The method of claim 1, wherein the text or binary format is JSON, Avro or Protobuf.

9. A computerized system comprising:
    a memory storing executable instructions; and
    a hardware processor, coupled to the memory, that performs a method by executing the instructions stored in the memory, the method comprising:
    connecting, by the hardware processor, to a database at a source;
    querying, by the hardware processor, the database for data associated with a characteristic;
    identifying, by the hardware processor, the data;
    organizing, by the hardware processor, the data into a batch at the source based on business-defined rules, wherein the batch condenses a plurality of rows of data in the database associated with the characteristic into one row of data associated with the characteristic;
    transforming, by the hardware processor, the batch into a packet having a text or binary ready-to-consume format at the source; and
    publishing, by the hardware processor, the packet as a ready-to-consume business object.

10. The computerized system of claim 9, further comprising:
    transmitting, by the hardware processor, the ready-to-consume business object to a message broker, wherein the ready-to-consume business object is decoupled from the database at the source; and
    transmitting, by the message broker, the ready-to-consume business object to a user device.

11. The computerized system of claim 9, further comprising:
    accessing, by a user device, the ready-to-consume business object; and
    consuming, by the user device, the ready-to-consume business object without modifying the data of the ready-to-consume business object into a different format.

12. The computerized system of claim 9, further comprising:
    monitoring, by the hardware processor, the database at the source for changes in the data in the database;
    detecting, by the hardware processor, a change in the data in the database; and
    connecting, by the hardware processor, to the database at the source and repeating the method of claim 9.

13. The computerized system of claim 9, further comprising encrypting, by the hardware processor, the packet before the publishing.

14. The computerized system of claim 9, wherein the text or binary format is JSON, Avro or Protobuf.

15. A non-transitory computer-readable media embodying program instructions that, when executed by a processor, cause the processor to implement a method, comprising:
- connecting, by the processor, to a database at a source;
- querying, by the processor, the database for data associated with a characteristic;
- identifying, by the processor, the data;
- organizing, by the processor, the data into a batch at the source based on business-defined rules, wherein the batch condenses a plurality of rows of data in the database associated with the characteristic into one row of data associated with the characteristic;
- transforming, by the processor, the batch into a packet having a text or binary ready-to-consume format at the source; and
- publishing, by the processor, the packet as a ready-to-consume business object.

16. The non-transitory computer-readable media of claim 15, further comprising:
- transmitting, by the processor, the ready-to-consume business object to a message broker, wherein the ready-to-consume business object is decoupled from the database at the source; and
- transmitting, by the message broker, the ready-to-consume business object to a user device.

17. The non-transitory computer-readable media of claim 15, further comprising:
- accessing, by a user device, the ready-to-consume business object; and
- consuming, by the user device, the ready-to-consume business object without modifying the data of the ready-to-consume business object into a different format.

18. The non-transitory computer-readable media of claim 15, further comprising:
- monitoring, by the processor, the database at the source for changes in the data in the database;
- detecting, by the processor, a change in the data in the database; and
- connecting, by the processor, to the database at the source and repeating the method of claim 15.

19. The non-transitory computer-readable media of claim 15, further comprising encrypting, by the processor, the packet before the publishing.

20. The non-transitory computer-readable media of claim 15, wherein the querying comprises queries having incremental Structured Query Language (SQL).

* * * * *